3,749,701
ACRYLONITRILE COPOLYMERS
Helmut Engelhard, Leverkusen, Francis Bentz, Cologne, and Dieter Brokmeier and Gunther Nischk, Dormagen, Germany, assignors to Farbenfabriken Bayer Aktiengesellschaft, Leverkusen, Germany
No Drawing. Filed May 10, 1971, Ser. No. 141,959
Claims priority, application Germany, May 14, 1970,
P 20 23 546.5
Int. Cl. C08f 15/22
U.S. Cl. 260—80.72                    24 Claims

ABSTRACT OF THE DISCLOSURE

Acrylonitrile copolymers having high affinity for acidic and metal complex dyes, containing, in copolymerized form, up to 40% by weight of a comonomer of the formula $$CH_2=C(R)-\underset{O}{\overset{O}{\|}}C-O-CH(R_1)-CH_2-N\underset{R_2}{\overset{}{\diagdown}}N$$

The copolymers are useful for the production of fibers and films.

---

This invention relates to acrylonitrile copolymers having a high affinity for acidic and metal complex dyes, and to a process for their production.

It is known that polymers having an affinity for acidic dyes can be obtained by copolymerising acrylonitrile with, for example, N-(3-dimethylaminopropyl)-(meth)acrylamide, β-diethylaminoethyl vinyl ether, 2- or 4-vinyl pyridine, 2-methyl-5-vinyl pyridine or basic acrylates, such as dialkylaminoalkyl (meth)acrylates (cf. Houben-Weyl, vol. 14/1, pages 998 et seq., 1961).

1-vinylimidazole and 1-methyl-2-vinyl imidazole have also been described as similarly acting additives (cf. Houben-Weyl, vol. 14/1, pages 998 et seq., 1961, and J. Amer. Chem. Soc., 75, 3398–3400 (1953)). Fibres spun from such acrylonitrile copolymers containing 1-vinylimidazole as basic monomer are known to be of a yellow natural colour (G. E. Ham, Z. Textilindustrie 57, 594 (1955)). This is an important hindrance for using the fibres for textiles. Another handicap in handling with the above mentioned imidazole derivatives is their expensive synthesis by thermal cracking of 1-β-hydroxyäthylimidazoles (German Pat. 854,955) respectively 1-methyl-2-hydroxyäthylimidazole because special catalyzing systems are necessary.

It is an object of this invention to provide acrylonitrile copolymers having a high affinity for acidic and metal complex dyes, that have a distinctly improved natural color compared with the hitherto known acrylonitrile copolymers. Fibres spun from copolymers of this invention have an improved ability to withstand bleaching in the dyed or undyed state. In addition they show a better adsorption of water. Another advantage is their good reservation to basic dyes. Other objects will be made evident from the following description.

These objects are accomplished by an acrylonitrile copolymer which comprises at least 60% by weight of copolymerised acrylonitrile, and from 1 to 40% by weight of a copolymerised basic comonomer having the general formula:

$$CH_2=C(R)-\underset{O}{\overset{O}{\|}}C-O-CH(R_1)-CH_2-N\underset{R_2}{\overset{}{\diagdown}}N$$

in which

R and $R_1$, which may be the same or different, each represents hydrogen or a $C_1$ to $C_4$ alkyl radical, and
$R_2$ represents hydrogen or a $C_1$ to $C_3$ alkyl radical or aryl radical.

The copolymers may optionally contain from 0 to 39% by weight of another polymerised comonomer from the group of acrylic, methacrylic, vinyl and vinylidene compounds.

The copolymers according to the invention have a K value [according to Fikentscher, Cellulosechemie 13, 58 (1932)] of from 70 to 120.

The novel acrylonitrile copolymers are obtained by copolymerising at least 60% by weight of acrylonitrile and a basic comonomer, optionally together with another polymerisable acrylic or vinyl comonomer, distinguished by the fact that from 40 to 1% by weight of a compound corresponding to the general formula:

$$CH_2=C(R)-\underset{O}{\overset{O}{\|}}C-O-CH(R_1)-CH_2-N\underset{R_2}{\overset{}{\diagdown}}N$$

in which

R represents hydrogen or a $C_1$ to $C_4$ alkyl radical,
$R_1$ represents hydrogen or a $C_1$ to $C_4$ alkyl radical,
$R_2$ represents hydrogen, $C_1$ to $C_3$ alkyl or aryl radical, is used as the basic comonomer.

It was surprising that a quantity as small as about 3 to 4% by weight of copolymerised comonomer would be sufficient to provide an affinity for acidic dyes comparable with that of conventional acrylic fibres modified with alkyl pyridines, although the basic nitrogen component of the novel monomers is smaller than that of a vinyl or alkyl-vinyl pyridine used according to the prior art, as also shown by titration.

A remarkable fact is the improved ability of the coloured fibres to withstand bleaching in comparison with known fibres modified with alkyl pyridine. In contrast to the known fibres the absorption of water is increased.

The copolymers obtained and the fibres spun therefrom have a distinctly improved natural colour compared with conventional basically modified copolymers.

The novel (alk)acrylic esters containing imidazole groups used as basic comonomers in accordance with the invention are obtained in accordance with methods known per se by adding alkene oxides to imidazole compounds to form primary or secondary 1-(β-hydroxyalkyl)-imidazoles and reacting these alcohols with an (alk)acrylic acid derivative:

$$\underset{H}{\overset{\diagup N\diagdown}{N}}-R_2 + CH_2-CH-R_3 \longrightarrow$$

$$\underset{\underset{H}{CH_2-C-OH}}{\overset{\diagup N\diagdown}{N}}-R_2 + X-\underset{R}{\overset{O}{\|}}C-C=CH_2 \longrightarrow \underset{CH_2-CH-O-\underset{R}{\overset{O}{\|}}C-C=CH_2}{\overset{\diagup N\diagdown}{N}}-R_2$$

In this formulae, the symbols R, $R_1$ and $R_2$ have the meanings already defined, whilst X represents halogen, alkoxy, aryloxy or acyloxy.

Addition of the epoxides, for example ethylene oxide, propylene oxide, 1,2-butylene oxide, to the imidazoles is carried out in the absence of catalysts by introducing the oxide in the form of a gas, or adding it dropwise in the form of a liquid, to the molten or dissolved imidazole compound. Suitable imidazole compounds include imidazole itself, and its derivatives substituted in the 2-position by methyl, ethyl or propyl. After distillation, the yield comprises 90 to 95% of adduct, which is then esterified by known methods with corresponding (alk)-acrylic acid derivatives, for example acids, acid chlorides or acid anhydrides, or transesterified with (alk)acrylic acid esters. The basic 1-($\beta$-(alk)acryloyloxyalkyl)-imidazoles are purified by distillation in a high vacuum.

Copolymerisation of the of the 1-[$\beta$-(alk)acryloyloxyalkyl]-imidazoles can be carried out by known methods, either in bulk, in solution or in dispersion. Precipitation polymerisation in an aqueous medium is advantageously used for copolymerisation with acrylonitrile.

The copolymerisation of acrylonitrile with 1-[$\beta$-(alk)-acryloyloxyalkyl]-imidazoles is preferably carried out in the presence of other polymerisable monomers, for example (meth)acrylic esters, vinyl acetate, vinyl chloride, vinylidene chloride(meth)acrylamide or N-substituted (meth)acrylamides, for example N-isopropyl or N-($\alpha,\alpha$-dimethyl-$\gamma$-oxobutyl)-acrylamide. It is possible in this way to influence the solubility of the polymers as well as their affinity for dyes, their inflammability, their absorption of water and so on. The contribution of the basic imidazole acrylates to the total weight of the reagents to be polymerised amounts to from 1 to 40% by weight and preferably to from 1 to 15% by weight.

The copolymerisation reaction is carried out in a weak sulphuric or nitric acid solution at a pH value of from 1 to 6, preferably from 2 to 4.5, with a water-soluble radical-forming catalyst system, such as a peroxidic or azo compound, or with a Redox system based on a peroxide compound and a compound of sulphur in a low valence state, for example hydrogen peroxide, or potassium, sodium or ammonium persulphate, together with sulphur dioxide, an alkali metal hydrosulphite, an alkali metal pyrosulphite, an alkali metal thiosulphate, an alkali metal sulfinate. The catalysts are used in quantities of from 0.25 to 5% by weight, based on the total weight of the polymerisation reagents. When Redox systems are used, it is preferred to have a molar ratio of from 10:1 to 1:10 between the oxidising and reducing agents. The water is used in a quantity from 5 to 15 times greater than that in which the monomers are used. The temperature is in the range from 0 to 90° C., preferably from 20 to 90° C.

After working up, the copolymers obtained in this way have K values [according to Fikentscher, Cellulosechemie 13, 58 (1932)] of from 70 to 120 and are thus suitable for commercial use. They are soluble in dimethyl formamide, show an affinity for acidic dyes, an improved natural colour and absorption of water, and can be spun into filaments in the usual way. It should be mentioned that the reservation to basic dyes is improved too.

The [$\beta$ - (alk)acryloyloxyalkyl] - imidazole content of the copolymers can be determined analytically by measuring the basic nitrogen, i.e. by dissolving the copolymer in a mixture of formic acid and nitromethane, followed by titration with perchloric acid. It is also possible in this way to determine the basic nitrogen component of the starting monomer, which is used as a reference value. In this method, only the aza nitrogen atom in the 3-position of the imidazole ring is detected, as expected.

In order to assess dyeability, a thin film (250 to 500$\mu$) is prepared from an approximately 15 to 20% by weight dimethyl formamide solution of the polymer on a glass plate. This film is dried for a few hours at 60 to 70° C., removed from the glass plate and then boiled for 1 hour in water in order to remove any dimethyl formamide entrained in it. Thereafter, the film is boiled for 1.5 hours with 100 parts by volume of a dye solution [1 part by weight of a blue dyestuff (C.I. Acid blue 25, 62055) and 8 parts by volume of 10% by weight sulphuric acid dissolved in 1000 parts by volume of water] and, finally, is boiled with distilled water for about another 15 minutes. The dried, dyed film is dissolved in 1000 parts by volume of dimethyl formamide and the extinction of this solution is measured at 20° C. and at the wavelength indicated. The extinction is expressed as extinction per g. of film.

In the examples and in the above paragraph the ratio of parts by weight to parts by volume is as kg. to litres. The K value was determined in accordance with Fikentscher, Cellulosechemie, 13, 58 (1932).

The examples are to further illustrate the invention without limiting it.

EXAMPLE 1

(a) Preparation of the monomer 1-($\beta$-hydroxyethyl)-2-methyl-imidazole: 1000 parts by weight of 2-methyl imidazole are fused. Ethylene oxide is introduced with stirring at 140 to 160° C. until an increase of 550 parts by weight is obtained, followed by distillation in a high vacuum.

Yield: 1320 parts by weight (87%).

B.P.$_{0.05-2}$: 168 to 174° C.

$C_6H_{10}N_2O$ (126) Calculated (percent): C, 57.1; H, 7.9; N, 22.2. Found (percent): C, 56.5; H, 7.7; N, 22.3.

1-($\beta$-methacryloyloxyethyl)-2-methyl - imidazole: (1) From acid chloride and alcohol.—300 parts by weight of 1-($\beta$-hydroxyethyl)-2-methylimidazole are taken up in 600 parts by volume of methylene chloride, followed by the addition of a solution of 100 parts by weight of sodium hydroxide in 300 parts by volume of water. 2 parts by weight of 4-methyl-2,6-ditert-butyl phenol are added to this mixture, followed by the dropwise addition over a period of 1 hour at room temperature, with occasional cooling, of 240 parts by volume of methacryloyl chloride.

After stirring for 5 hours, the organic phase is separated and concentrated evaporation in vacuo, and the residual syrup is distilled.

Yield: 273 parts by weight (75%).

B.P. $_{0.05}$: 133 to 140° C.

$C_{10}H_{14}N_2O_2$ (194) Calculated (percent): C, 61.8; H, 7.2; N, 14.4. Found (percent): C, 61.9; H, 7.5; N, 14.0.

Basic nitrogen content (by titration with $HClO_4$ in $HCOOH/CH_3NO_2$): Calculated: 5.15 Val/kg. Found: 5.0 Val/kg.

(2) By trans-esterification in the presence of potassium carbonate and sodium methoxide.—Following the addition of 2 parts by weight of 4-methyl-2,6-di-tert-butyl phenol and 20 parts by weight of potassium carbonate, 504 parts by weight of 1-($\beta$-hydroxyethyl)-2-methyl-imidazole and 845 parts by weight of methyl methacrylate are heated to 120° C. A solution of 8 parts by weight of sodium in 100 parts by volume of absolute methanol is then added dropwise very slowly while stirring, as a result of which methanol distils off. After the methanol has been distilled off, the potassium carbonate is filtered off and the filtrate is fractionated in a high vacuum.

Yield: 520 parts by weight (67%).

B.P.$_{0.3}$: 170° C.

(b) Copolymerisation 3.5 parts by weight of 1-($\beta$-methacryloyloxyethyl)-2-methyl-imidazole, 3.5 parts by weight of methyl acrylate and 63 parts by weight of acrylonitrile were introduced into 500 parts by volume of water, and the pH value of the mixture was adjusted to 3.8 by the addition of dilute sulphuric acid. At 55° C., polymerisation was initiated by the addition of 0.1 part by volume of 0.01% by weight ferrous sulphate solution, 1.5 parts by volume of 30% by weight hydrogen peroxide solution and 0.3 part by volume of thioglycol. After 8 hours, the reaction product was worked up, giving 47 parts by weight (67%) of a white polymer.

K value: 81.

Tertiary nitrogen content: 0.18 Val/kg., in other words of the 5% by weight of basic comonomer originally introduced, 3.5% by weight are incorporated into the copolymer.

Dyeability (578 mµ, blue dyestuff, C.I. acid blue 25, 62055)

$$33 \frac{\text{Extinction}}{\text{film}} (g.^{-1})$$

This copolymer was dry spun to filaments of an excellent natural colour (denier: 3.3 dtex., cut: 60 mm.; colour: light, lustrous) and dyed in comparison to known fibres (5–6 percent by weight alkyl pyridine as a basic comonomer) as standard.

Acid dyes: With C.I. acid blue 205 at pH=2 and 6 the colours were deeper than standard. For C.I. acid black 24 the fibres of this invention show a greater affinity. Fibres known to the art only have a dark-green shade.

Metal complex dyes: pH=2. Colours like standard, pH=6 the colour shade has increased against standard.

Basic dyes: Better reservation than standard.

Ability to withstand bleaching: (Xenotest, according to DIN 54004.) All colorations have a shade-value greater than 6. Against standard the shades are improved about 0.5–1 notes.

Absorption of water (25° C.; 65% relative humidity):

$$\psi = \frac{m_w}{m_{dr}} \cdot 100 \text{ (percent)}$$

$m_w$ = mass of water
$m_{dr}$ = mass of dry substance
Fibres of the invention: $\psi = 2.0\%$
Known fibres: $\psi = 1\%$

EXAMPLE 2

63 parts by weight of acrylonitrile and 7 parts by weight of 1-(β-methacryloyloxyethyl)-2-methyl-imidazole are introduced into 930 parts by volume of water. The pH value of the reaction mixture is adjusted to 2.8 by the addition of dilute $HNO_3$, after which the reaction mixture is stirred and heated to 55° C., and a gentle stream of nitrogen is passed through the solution. Polymerization is initiated by the addition of 0.6 part by weight of potassium persulphate and 0.3 part by weight of sodium metabisulphite. After a reaction time of 7 hours, the polymer is filtered off under suction, washed out and dried.

Yield: 50 parts by weight (71.5%).
K-value: 117.
Basic nitrogen content: 0.35 Val/kg.
Starting monomer: 5.05 Val/kg.

It follows from this that of the 10% by weight of 1-(β-methacryloyloxyethyl)-2-methyl-imidazole originally introduced, 7% by weight have been incorporated into the copolymer.

Dyeability: (578 mµ, blue dyestuff, C.I. acid blue 25, 62055

$$43 \frac{\text{Extinction}}{\text{film}} (g.^{-1})$$

EXAMPLE 3

14 parts by weight of 1-(β-methacryloyloxyethyl)-2-methyl-imidazole and 126 parts by weight of acrylonitrile are added to 2000 parts by volume of distilled water, the pH value is adjusted with dilute $HNO_3$ to 3.6, the mixture is heated to 55° C., stirred and polymerisation is initiated under $N_2$ with 2.8 parts by weight of potassium persulphate and 0.4 part by weight of sodium metabisulphite.

After a reaction time of 6 hours, followed by working up, 119 parts by weight (81.5%) of polymer are obtained.
K value: 88.5.
Basic nitrogen content: 0.42 Val/kg., i.e. 8.3% by weight of basic comonomer have been incorporated into the copolymer.

Dyeability (578 mµ, blue dyestuff, C.I. acid blue 25, 62055

$$43.4 \frac{\text{Extinction}}{\text{film}} (g.^{-1})$$

EXAMPLE 4

35 parts by weight (5% by weight) of 1-(β-methacryloyloxyethyl)-2-methyl-imidazole, 35 parts by weight (5% by weight) of methyl acrylate and 630 parts by weight (90% by weight) of acrylonitrile are introduced into 7000 parts by volume of water. The pH value of the solution is adjusted with dilute $H_2SO_4$ to 2.8, the temperature is increased to 55° C. and polymerisation is initiated under nitrogen with 12 parts by weight of potassium persulphate and 4 parts by weight of sodium metabisulphite. After a reaction time of 7 hours at 55° C. to 56° C., the product is filtered off under suction, washed thoroughly with water and methanol and dried in vacuo at 50° C.

Yield: 546 parts by weight (78%).
K value: 82.
Basic nitrogen content: 0.17 Val/kg., in other words 3.3% by weight of basic comonomer have been incorporated into the copolymer.

Dyeability (578 mµ, blue dyestuff, C.I. acid blue 25, 62055

$$32 \frac{\text{Extinction}}{\text{film}} (g.^{-1})$$

The copolymer can be dry spun from a dimethyl formamide solution stabilised with a little thioglycol, and stretched into fibres having the following properties:

Denier: 3.3 dtex.
Cut: 60 mm.
Colour: Light, lustrous.

After the fibres have been dyed with the acidic dyes C.I. acid blue 25, 62055 and C.I. acid red 73, 27290), the depths of colour and intensities are identical with those of a similarly treated acrylic fibre modified with alkyl-vinyl pyridine (5% by weight included in the copolymer).

EXAMPLE 5

(a) Preparation of the monomer

1 - (β-hydroxypropyl)-2-methyl-imidazole: This monomer is prepared in the same way as the 1-(β-hydroxyethyl)-2-methylimidazole of Example 1. The quantity of propylene oxide required is added dropwise. 1650 parts by weight of 1-(β-hydroxypropyl)-2-methylimidazole (95%) are obtained from 1000 parts by weight of 2-methyl imidazole.

B.P.$_{0.2-0.4}$: 163 to 173° C.

Calculated (percent): C, 60.0; H, 8.6; N, 20.0. Found (percent): C, 59.1; H, 8.8; N, 19.7.

The secondary alcohol group can be detected directly from the IR spectrum of the compound and indirectly from the IR and NMR pattern of the following ester prepared therefrom.

1-(β-methacryloyloxypropyl)-2-methyl-imidazole: 140 parts by weight of the above-mentioned secondary alcohol, 400 parts by weight of methyl methacrylate, 25 parts by weight of tetrabutyl titanate and 5 parts by weight of 2,6-di-tert-butyl-p-phenol are heated at 110° C. until there is no further elimination of methanol. This is followed by distillation in vacuo. The fraction of B.P.$_{0.1}$ 150 to 180° C. is collected and then redistilled.

B.P.$_{0.08}$: 120 to 130° C.
Yield: 165 parts by weight (79%).
$C_{11}H_{16}N_2O_2$ (208). Calculated (percent): C, 63.5; H, 7.7; N, 13.5; O, 15.4. Found (percent): C, 63.2; H, 7.7; N, 13.9; O, 15.9.

Basic nitrogen content: Calculated: 4.8 Val/kg. Found: 4.6 Val/kg.

(b) Copolymerisation 63 parts by weight of acrylonitrile and 7 parts by weight of 1-(β-methacryloyloxypropyl) - 2-methyl-imidazole are taken up in 930 parts by volume of water, the pH is adjusted to 2.8 with dilute nitric acid and polymerisation is initiated at 55° C. by the addition of 2 parts by weight of potassium persulphate and 0.4 part by weight of sodium metabisulphite to the solution which has nitrogen bubbled through it. The reaction product is worked up after 6 hours.

Yield: 54 parts by weight (77%).
K value: 78.
Basic nitrogen content: 0.28 Val/kg.
Starting monomer: 4.6 Val/kg., in other words 6.1% of the 1 - (β-methacryloyloxypropyl)-2-methyl-imidazole have been incorporated into the polymer.
Dyeability (578 mµ, blue dyestuff, C.I. acid blue 25, 62055

$$54 \frac{\text{Extinction}}{\text{film}} (g.^{-1})$$

EXAMPLE 6

The conditions are as in Example 4, except that the pH value is adjusted to 2.8 with dilute sulphuric acid.
Yield: 47 parts by weight (67%).
K value: 75.
Dyeability:

$$53 \frac{\text{Extinction}}{\text{film}} (g.^{-1})$$

EXAMPLE 7

59.5 parts by weight of acrylonitrile, 3.5 parts by weight of methyl acrylate and 7 parts by weight of 1-(β-methacryloyloxypropyl) - 2 - methyl-imidazole are added to 930 parts by volume of distilled water, and the resulting mixture is polymerised at 55° C./pH 2.8 (dilute nitric acid) with 2 parts by weight of potassium persulphate and 0.4 part by weight of sodium metabisulphite.
Reaction time: 6 hours.
Yield: 51 parts by weight (73%).
K value: 84.
Basic nitrogen content: 0.28 Val/kg., 6.1% by weight of incorporated comonomer.
Dyeability (578 mµ, blue dyestuff, C.I. acid blue 25, 62055

$$56 \frac{\text{Extinction}}{\text{film}} (g.^{-1})$$

EXAMPLE 8

(a) Preparation of the monomer 1-(β - hydroxybutyl) - 2 - methyl-imidazole: 500 parts by weight of 2-methyl imidazole are reacted as in Example 1 with 460 parts by weight of butylene oxide at 150 to 170° C.

Distillation gives 890 parts by weight (93%) of
B.P.$_{0.3-0.05}$
160 to 168° C. of the secondary alcohol, which solidifies in the receiver.
M.P.: 82 to 90° C.
$C_8H_{14}N_2O$ (154) calculated (percent): C, 62.3; H, 9.1; N, 18.2; O, 10.4. Found (percent): C, 61.8; H, 9.3; N, 17.2; O, 11.5.

In this instance, too, the secondary structure of the alcohol is detected from the infra-red spectrum and from the NMR and IR spectra of the following ester.

1-(β - methacryloyloxybutyl) - 2 - methyl-imidazole: 770 parts by weight of 1-(β-hydroxybutyl)-2-methyl-imidazole, 2000 parts by weight of methyl methacrylate, 40 parts by weight of 4-methyl-2,6-di-tert-butyl phenol and 125 parts by weight of tetrabutyl titanate are reacted with one another as already described. The ester boils at 131 to 140° C.; 0.4 mm.
Yield: 760 parts by weight (68.5%).
$C_{12}H_{18}N_2O_2$ (222). Calculated (percent): C, 65.0; H, 8.1; N, 12.6; O, 14.4. Found (percent): C, 65.7; H, 8.5; N, 12.5; O, 13.9.

Basic nitrogen: Calculated: 4.5 Val/kg. Found: 4.3 Val/kg.

(b) Copolymerisation 930 parts by volume of water, 63 parts by weight of acrylonitrile and 7 parts by weight of 1-(β-methylacryloyloxybutyl)-2-methyl-imidazole are mixed, the pH value of the resulting mixture is adjusted to 2.8 with dilute nitric acid at 55° C., followed by polymerisation under nitrogen in the presence of 0.8 part by weight of potassium persulphate and 0.3 part by weight of sodium metabisulphite. The reaction product is worked up after 6 hours.
Yield: 49 parts by weight (70%).
K value: 77.
Basic nitrogen: 0.32 Val/kg., i.e. 7.4% by weight of the basic monomer have been incorporated into the polymer.
Dyeability (578 mµ, blue dyestuff, C.I. acid blue 25, 62055

$$57 \frac{\text{Extinction}}{\text{film}} (g.^{-1})$$

What we claim is:

1. An acrylonitrile copolymer which comprises at least 60% by weight of copolymerised acrylonitrile, and from 1 to 40% by weight of a copolymerised basic comonomer having the general formula:

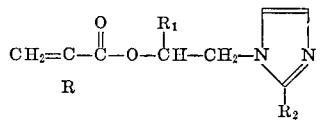

in which
R is methyl,
$R_1$ represents hydrogen or a $C_1$ to $C_2$ alkyl radical, and
$R_2$ represents methyl.

2. The acrylonitrile copolymer of claim 1, said copolymer having a K value (according to Fikentscher, Cellulosechemie, 13, 58 (1932)) of from 70 to 120.

3. The acrylonitrile copolymer of claim 1 which comprises up to 39% by weight of at least one additional copolymerisable comonomer containing an ethylenically unsaturated group.

4. The acrylonitrile copolymer of claim 3 wherein said additional comonomer is selected from the group consisting of an acrylic ester, a methacrylic ester, vinyl acetate, vinyl chloride, vinylidene chloride, acrylamide, methacrylamide, an N-substituted acrylamide and an N-substituted methacrylamide.

5. The acrylonitrile copolymer of claim 3 wherein said additional comonomer is methyl acrylate.

6. The acrylonitrile copolymer of claim 1 wherein the amount of said basic comonomer is from 1 to 15% by weight.

7. The acrylonitrile copolymer of claim 3, wherein the amount of said basic comonomer is from 1 to 15% by weight.

8. The copolymer of claim 3 wherein said comonomer is a vinyl monomer.

9. The copolymer of claim 8 wherein said comonomer is an acrylic comonomer.

10. The copolymer of claim 8 wherein said comonomer is a methacrylic comonomer.

11. The copolymer of claim 3 wherein at least two of said additional copolymerizable comonomers are present.

12. A process for producing a copolymer which comprises copolymerising acrylonitrile with from 1 to 40% by weight, based on the total of monomers, of a basic comonomer having the general formula:

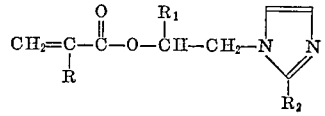

wherein

R and $R_2$ are methyl and $R_1$ is H or a $C_1$ to $C_2$ alkyl radical, said polymerisation being carried out in aqueous medium at a pH value of from 1 to 6 and a temperature of from 0 to 90° C. in the presence of a water-soluble radical-forming catalyst system.

13. The process of claim 12 wherein said catalyst system is selected from the group consisting of a peroxidic compound, an azo compound, and a Redox system comprising a peroxidic compound and a compound of sulphur in a low valence state.

14. The process of claim 12 wherein the quantity said catalyst is from 0.25 to 5% by weight, based on the total weight of polymerisation reagents.

15. The process as claimed of claim 12 wherein said copolymerising is carried out in the presence of up to 39% by weight, based on total monomer, of at least one additional copolymerisable compound containing an ethylenically unsaturated group.

16. The process of claim 15 wherein said additional comonomer is selected from the group consisting of an acrylic ester, a methacrylic ester, vinyl acetate, vinyl chloride, vinylidene chloride, acrylamide, methacrylamide, an N-substituted acrylamide, and an N-substituted methacrylamide.

17. The process of claim 15 wherein said additional comonomer is methyl acrylate.

18. The process of claim 13 wherein said Redox system comprises a peroxidic oxydizing agent selected from the group consisting of hydrogen peroxide, potassium persulphate, sodium persulphate or ammonium persulphate; and a sulphur containing reducing agent selected from the group consisting of sulphur dioxide, an alkali metal hydrosulphite, an alkaline metal pyrosulphite, an alkaline metal thiosulphate, or an alkaline metal sulfinate.

19. The process of claim 15 wherein said compound is a vinyl monomer.

20. The process of claim 19 wherein said compound is an acrylic monomer.

21. The process of claim 19 wherein said compound is a methacrylic monomer.

22. The process of claim 15 wherein at least two of said additional copolymerizable comonomers are present.

23. A fibre comprising an acrylonitrile copolymer as claimed in claim 1.

24. A film comprising an acrylonitrile copolymer as claimed in claim 1.

References Cited
UNITED STATES PATENTS 2,727,021   12/1955   Price _____ 260—80.72

HARRY WONG, Jr., Primary Examiner

U.S. Cl. X.R.

8—162; 117—124; 260—31.2 N, 32.4, 32.6 N, 47 UA, 85.5 B, 85.5 Am, 309